US012502221B2

United States Patent
Ryals et al.

(10) Patent No.: US 12,502,221 B2
(45) Date of Patent: Dec. 23, 2025

(54) SYSTEMS AND METHODS FOR NEGATIVE REGISTRATION OF BONE SURFACES

(71) Applicant: DEPUY IRELAND UNLIMITED COMPANY, Ringaskiddy (IE)

(72) Inventors: Adam Ryals, Fuquay Varina, NC (US); Daniel Girardeau-Montaut, Grenoble (FR)

(73) Assignee: DePuy Ireland Unlimited Company, Ringaskiddy (IE)

( * ) Notice: Subject to any disclaimer, the term of this patent is extended or adjusted under 35 U.S.C. 154(b) by 255 days.

(21) Appl. No.: 18/197,827

(22) Filed: May 16, 2023

(65) Prior Publication Data

US 2024/0382259 A1 Nov. 21, 2024

(51) Int. Cl.
*A61B 34/10* (2016.01)
*A61F 2/46* (2006.01)
(Continued)

(52) U.S. Cl.
CPC .............. *A61B 34/10* (2016.02); *A61F 2/461* (2013.01); *A61F 2/4657* (2013.01);
(Continued)

(58) Field of Classification Search
CPC ... A61B 2034/105; A61B 34/10; A61B 34/20; A61B 34/30; A61B 90/361;
(Continued)

(56) References Cited

U.S. PATENT DOCUMENTS 6,205,411 B1 3/2001 DiGioia, III et al.
8,010,180 B2 8/2011 Quaid et al.
(Continued)

FOREIGN PATENT DOCUMENTS

EP 3338724 A1 6/2018
EP 2242453 B1 11/2018
(Continued)

OTHER PUBLICATIONS

Gibbons et al., "Development of a Statistical Shape-Function Model of the Implanted Knee for Real-Time Prediction of Joint Mechanics," Journal of Biomechanics, vol. 88, 2019, pp. 55-63.
(Continued)

*Primary Examiner* — Samuel S Hanna
(74) *Attorney, Agent, or Firm* — Barnes & Thornburg LLP (57) ABSTRACT

Systems and methods for bone surface geometry generation include a computing device. The computing device projects first geometry data indicative of a first bone-contacting surface of a first bone of a patient to a coordinate space of a second bone of the patient to generate projected geometry. The second bone includes a second bone-contacting surface that interfaces with the first bone-contacting surface. The computing device also maps the projected geometry to a plurality of poses in a range of motion of the first bone relative to the second bone using position data indicative of relative positions of the first bone and the second bone at the plurality of poses in the range of motion. The computing device further selects intersecting geometry from the mapped, projected geometry to generate second geometry data indicative of the second bone-contacting surface.

15 Claims, 10 Drawing Sheets

(51) Int. Cl.
*A61B 34/20* (2016.01)
*A61B 90/00* (2016.01)

(52) U.S. Cl.
CPC . *A61B 2034/105* (2016.02); *A61B 2034/2072* (2016.02); *A61B 2090/373* (2016.02); *A61B 2090/378* (2016.02); *A61F 2002/4633* (2013.01)

(58) Field of Classification Search
CPC ...... A61B 2034/2055; A61B 2090/373; A61B 2090/378; A61B 2034/2068
See application file for complete search history.

(56) References Cited

U.S. PATENT DOCUMENTS

| | | | |
|---|---|---|---|
| 9,101,394 B2 | 8/2015 | Arata et al. | |
| 9,364,291 B2 | 6/2016 | Bellettre et al. | |
| 9,665,686 B2 | 5/2017 | Van Vorhis et al. | |
| 9,827,051 B2 | 11/2017 | Arata et al. | |
| 9,913,692 B2 | 3/2018 | Arata et al. | |
| 9,916,421 B2 | 3/2018 | Vorhis et al. | |
| 10,064,685 B2 | 9/2018 | Bellettre et al. | |
| 10,813,574 B2 | 10/2020 | Fleig et al. | |
| 11,376,072 B2 | 7/2022 | Bellettre et al. | |
| 2005/0251148 A1 | 11/2005 | Friedrich et al. | |
| 2007/0219561 A1 | 9/2007 | Lavallee et al. | |
| 2008/0262812 A1* | 10/2008 | Arata .................. | A61B 90/36 703/11 |
| 2009/0209884 A1* | 8/2009 | Van Vorhis ............ | G16H 50/50 600/595 |
| 2010/0076563 A1 | 3/2010 | Otto et al. | |
| 2010/0153081 A1 | 6/2010 | Bellettre et al. | |
| 2016/0228193 A1 | 8/2016 | Moctezuma de La Barrera et al. | |
| 2017/0265944 A1 | 9/2017 | Shupe et al. | |
| 2018/0360544 A1 | 12/2018 | Vanheule et al. | |
| 2020/0345421 A1 | 11/2020 | White et al. | |
| 2022/0008207 A1 | 1/2022 | Heldreth et al. | |
| 2022/0125517 A1 | 4/2022 | Zimmermann et al. | |
| 2023/0080908 A1 | 3/2023 | Ali et al. | |

FOREIGN PATENT DOCUMENTS

| | | |
|---|---|---|
| WO | 2017106294 A2 | 6/2017 |
| WO | 2021170591 A1 | 9/2021 |

OTHER PUBLICATIONS

Lambrechts et al., "Artificial Intelligence Based Patient-Specific Preoperative Planning Algorithm for Total Knee Arthroplasty," Frontiers in Robotics and AI, vol. 9, Mar. 8, 2022, 11 pages.

Depuy Synthes, Velys Robotic-Assisted Solution for Total Knee, User Guide, Version 1.6, Rev. J, 2022, 217 pages.

Depuy Synthes, Velys Robotic-Assisted Solution for Total Knee, User Guide, Version 1.5, Rev. F, 2021, 214 pages.

International Search Report and Written Opinion completed Jul. 18, 2024 for PCT/EP2024/063262, 13 pages.

* cited by examiner

Fig. 10

SYSTEMS AND METHODS FOR NEGATIVE REGISTRATION OF BONE SURFACES

TECHNICAL FIELD

The present disclosure relates generally to orthopaedic surgical systems and methods and, more particularly, to systems and methods for generating bone surface geometry based on patient anatomy for use during an orthopaedic surgical procedure.

BACKGROUND

Joint arthroplasty is a well-known surgical procedure by which a diseased and/or damaged natural joint is replaced by a prosthetic joint, which may include one or more orthopaedic implants. For example, in a knee arthroplasty surgical procedure, a patient's natural knee joint is partially or totally replaced by a prosthetic knee joint. To facilitate the replacement of the natural joint with the prosthetic joint, orthopaedic surgeons may use a variety of orthopaedic surgical instruments such as, for example, surgical saws, cutting guides, reamers, broaches, drill guides, drills, positioners, insertion tools and/or other surgical instruments. A surgeon may use manual instruments such as cutting blocks or other cutting guides to perform the various resections in an orthopaedic procedure. Alternatively, or in addition, a surgeon may use a computer-assisted surgical navigation system, such as a robotic-assisted surgical system, to plan and/or assist with performing the various resections in an orthopaedic procedure.

SUMMARY

According to one aspect, a method for bone surface geometry generation may comprise projecting, by a computing device, first geometry data indicative of a first bone-contacting surface of a first bone of a patient to a coordinate space of a second bone of the patient to generate projected geometry, where the second bone includes a second bone-contacting surface that interfaces with the first bone-contacting surface. The method may further comprise mapping, by the computing device, the projected geometry to a plurality of poses in a range of motion of the first bone relative to the second bone using position data indicative of relative positions of the first bone and the second bone at the plurality of poses in the range of motion. The method may further comprise selecting, by the computing device, intersecting geometry from the mapped, projected geometry to generate second geometry data indicative of the second bone-contacting surface.

In some embodiments, the first bone is a tibia, the second bone is a femur, the bone-contacting surface is a tibial plateau, and the second bone-contacting surface is a femoral condyle. In some embodiments, the method may further comprise capturing, by the computing device, coordinate data indicative of the first bone-contacting surface. In some embodiments, the method may further comprise generating, by the computing device, the first geometry data based on the coordinate data.

In some embodiments, the method may further comprise capturing, by the computing device, the position data indicative of relative positions of the first bone and the second bone at the plurality of poses in the range of motion. In some embodiments, capturing the coordinate data may comprise receiving point data associated with a location of a registration tool having a pointer in contact with the first bone-contacting surface. In some embodiments, capturing the coordinate data may comprise receiving surface scan data from a laser scanner, a white light scanner, or a structured light scanner. In some embodiments, capturing the coordinate data may comprise receiving volumetric scan data from an ultrasound scanner.

In some embodiments, projecting the first geometry data to the coordinate space may comprise projecting the first geometry data to a cylindrical coordinate space having a first axis indicative of a linear position along a first imaginary axis relative to the first bone and a second axis indicative of an angle of rotation of the first bone relative to the second bone. In some embodiments, the first axis of the cylindrical coordinate space is indicative of a medial/lateral position, and the second axis of the cylindrical coordinate space is indicative of an angle of rotation in a sagittal plane. In some embodiments, mapping the projected geometry to each of the plurality of poses in the range of motion using the position data may comprise mapping coordinates of the first geometry to a linear position on the first axis, an angular positon on the second axis, and a radial distance from the second bone. In some embodiments, selecting the intersecting geometry may comprise selecting, for each combination of linear position on the first axis and angular position on the second axis, a smallest radial distance from the second bone of the mapped, projected geometry.

In some embodiments, the method may further comprise filtering, by the computing device, the first geometry data to remove geometry that does not interface with the second bone-contacting surface of the second bone. In some embodiments, filtering the first geometry data may comprise removing geometry data outside of predetermined bounds. In some embodiments, filtering the first geometry data may comprise removing geometry data having a slope above a predetermined threshold. In some embodiments, filtering the first geometry data may comprise removing geometry data that faces away from the second bone-contacting surface, where geometry data that faces away from the second bone-contacting surface has an angle that is above a predetermined threshold relative to an imaginary high point in the direction of the second bone-contacting surface. In some embodiments, the method may further comprise filtering, by the computing device, the second geometry data. Filtering the second geometry data may comprise removing geometry data that comprises outlier geometry. Filtering the second geometry data may comprise removing geometry data that is isolated from other geometry data of the second geometry data. In some embodiments, the method may further comprise capturing coordinate data associated with a location of a registration tool when a pointer of the registration tool is in contact with a portion of the second bone-contacting surface, and combining the coordinate data with the second geometry data indicative of the second bone-contacting surface.

According to another aspect, an orthopaedic surgical system may comprise a computing device configured to project first geometry data indicative of a first bone-contacting surface of a first bone of a patient to a coordinate space of a second bone of the patient to generate projected geometry, where the second bone includes a second bone-contacting surface that interfaces with the first bone-contacting surface. The computing device may be further configured to map the projected geometry to a plurality of poses in a range of motion of the first bone relative to the second bone using position data indicative of relative positions of the first bone and the second bone at the plurality of poses in the range of motion. The computing device may be further configured to select intersecting geometry from the mapped, projected geometry to generate second geometry data indicative of the second bone-contacting surface.

In some embodiments, the first bone is a tibia, the second bone is a femur, the bone-contacting surface is a tibial plateau, and the second bone-contacting surface is a femoral condyle. In some embodiments, the orthopaedic surgical system may further comprise a first tracking array configured to be secured to the first bone, a second tracking array configured to be secured to the second bone, and one or more sensors in communication with the computing device and configured to sense locations of the first and second tracking arrays. The computing device may be further configured to capture, using the one or more sensors, the position data indicative of relative positions of the first bone and the second bone at the plurality of poses in the range of motion.

In some embodiments, the orthopaedic surgical system may further comprise a registration tool having a pointer configured to contact the first bone-contacting surface. The one or more sensors may be further configured to sense a location of the registration tool. The computing device may be further configured to capture, using the one or more sensors, coordinate data associated with the location of the registration tool when the pointer is in contact with the first bone-contacting surface. In some embodiments, the computing device may be further configured to generate the first geometry data based on the coordinate data. In some embodiments, the computing device may be further configured to capture, using the one or more sensors, coordinate data associated with the location of the registration tool when the pointer is in contact with a portion of the second bone-contacting surface. The computing device may be further configured to combine the coordinate data with the second geometry data indicative of the second bone-contacting surface.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Terms representing anatomical references, such as anterior, posterior, medial, lateral, superior, inferior, etcetera, may be used throughout the specification in reference to the orthopaedic implants or prostheses and surgical instruments described herein as well as in reference to the patient's natural anatomy. Such terms have well-understood meanings in both the study of anatomy and the field of orthopaedics. Use of such anatomical reference terms in the written description and claims is intended to be consistent with their well-understood meanings unless noted otherwise.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
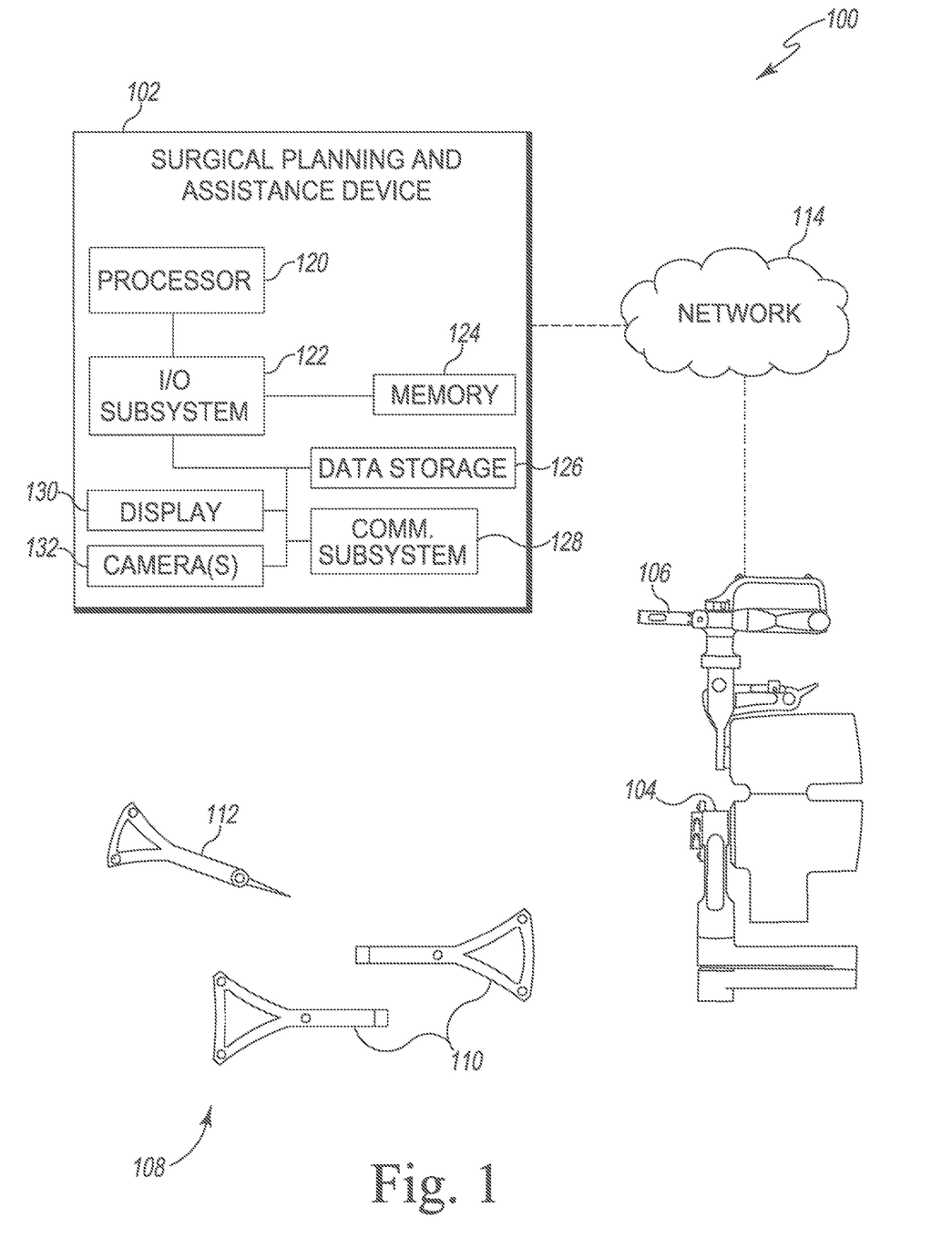
FIG. 1 is a schematic diagram of a system for planning and assisting an orthopaedic surgical procedure.

Referring now to FIG. 1, a surgical system 100 is used during an orthopaedic surgical procedure, such as a unicondylar knee arthroplasty (UKA) procedure, a total knee arthroplasty (TKA) procedure, a total hip arthroplasty (THA) procedure, or a total shoulder arthroplasty (TSA) procedure. During that procedure, an orthopaedic surgeon performs registration of the patient's anatomy with the system 100. In the illustrative embodiment, during registration, the system 100 captures geometry data for a bone-contacting surface of a joint (e.g., capturing data for a tibial plateau). As described further below, based on this captured geometry data as well as position data indicative of motion of the joint, the system 100 determines the geometry of an opposing bone surface (e.g., a femoral condyle interfacing with the tibial plateau). Accordingly, the system 100 is capable of registering or otherwise determining geometry for a bone surface without requiring the surgeon to perform direct registration of that bone surface. Thus, the system 100 may allow for accurate registration of a bone surface that is not exposed or is inaccessible to a physical probe for direct registration. As a specific example, in a UKA or TKA procedure, the system 100 may provide improved coverage of the posterior aspect of the femoral condyle as compared to direct registration of the femoral condyle. Further, by using only registration of the tibial plateau(s), the system 100 may avoid the need for lengthy physical registration of the femoral condyle(s). Additionally, in some embodiments, the system 100 may not require X-rays or other medical images, and thus may generate an accurate image-free dataset for the joint. Further, the system 100 may have improved accuracy compared to existing volumetric imaging techniques such as ultrasound imaging.

As shown in FIG. 1, the system 100 includes the surgical planning and assistance device 102 and the robotic surgical device 104 as well as multiple registration tools 108. The surgical planning and assistance device 102 may be embodied as any type of computer system capable of performing the functions described herein. For example, the surgical planning and assistance device 102 may be embodied as, without limitation, a workstation, a desktop computer, a laptop computer, a special-purpose compute device, a server, a rack-mounted server, a blade server, a network appliance, a web appliance, a tablet computer, a smartphone, a consumer electronic device, a distributed computing system, a multiprocessor system, and/or any other computing device capable of performing the functions described herein. Additionally, although the surgical planning and assistance device 102 is illustrated in FIG. 1 as embodied as a single computer, it should be appreciated that the surgical planning and assistance device 102 may be embodied as multiple devices cooperating together to facilitate the functionality described below. For example, in some embodiments, the system 100 may include a base station and a satellite station or other combination of computing devices. Additionally or alternatively, in some embodiments, the surgical planning and assistance device 102 may be embodied as a "virtual server" formed from multiple computer systems distributed across a network and operating in a public or private cloud.

As shown in FIG. 1, the illustrative surgical planning and assistance device 102 includes a processor 120, an I/O subsystem 122, memory 124, a data storage device 126, and a communication subsystem 128. Of course, the surgical planning and assistance device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or controller capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the surgical planning and assistance device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the surgical planning and assistance device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the surgical planning and assistance device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the surgical planning and assistance device 102 may be embodied as any communication circuit, device, or collection thereof, capable of enabling communications between the surgical planning and assistance device 102 and remote devices. The communication subsystem 128 may be configured to use any one or more communication technology (e.g., wireless or wired communications) and associated protocols (e.g., Ethernet, Bluetooth®, Wi-Fi®, WiMAX, etc.) to effect such communication.

As shown in FIG. 1, the surgical planning and assistance device 102 includes a display 130. The display 130 may be embodied as any type of display capable of displaying digital images or other information, such as a liquid crystal display (LCD), a light emitting diode (LED), a plasma display, a cathode ray tube (CRT), or other type of display device. In some embodiments, the display 130 may be coupled to a touch screen to allow user interaction with the surgical planning and assistance device 102.

The surgical planning and assistance device 102 further includes one or more cameras 132. Each of the cameras 132 may be embodied as a digital, near-infrared stereoscopic location tracking camera, or other digital imaging device coupled to the surgical planning and assistance device 102. Each camera 132 includes an electronic image sensor, such as an active-pixel sensor (APS), e.g., a complementary metal-oxide-semiconductor (CMOS) sensor, or a charge-coupled device (CCD). In the illustrative embodiment, multiple cameras 132 are arranged in an array and are thus capable of determining distance to objects imaged by the cameras 132.

The robotic surgical device 104 may be embodied as any type of robot capable of performing the functions described herein. Illustratively, the robotic surgical device 104 is embodied as a robotic arm that may be attached to a surgical table or otherwise positioned near a patient during the orthopaedic surgical procedure. The robotic surgical device 104 includes a surgical tool 106, illustratively embodied as a surgical saw 106. In use, the robotic surgical device 104 supports the surgical saw 106 and may constrain movement of the surgical saw 106 within a resection plane specified in a surgical plan, as described further below. The surgeon may activate the surgical saw 106 and perform the resection with the surgical saw 106 while the robotic surgical device 104 constrains movement of the surgical saw 106 to the resection plane. Although illustrated with a surgical saw 106, it should be understood that, in other embodiments, the robotic surgical device 104 may include, or be used with, one or more other surgical instruments, such as, for example, surgical burrs, chisels, impactors, reamers, and other powered surgical tools. The robotic surgical device 104 may illustratively be embodied as a VELYS™ Robotic-Assisted Solution, commercially available from DePuy Synthes Products, Inc. of Warsaw, Indiana.

The surgical planning and assistance device 102 and the robotic surgical device 104 may be configured to transmit and receive data with each other and/or other devices of the system 100 over a network 114. The network 114 may be embodied as any number of various wired and/or wireless networks. For example, the network 114 may be embodied as, or otherwise include, a wired or wireless local area network (LAN), a wired or wireless wide area network (WAN), a cellular network, and/or a publicly-accessible, global network such as the Internet. As such, the network 114 include any number of additional devices, such as additional computers, routers, stations, and switches, to facilitate communications among the devices of the system 100.

As shown in FIG. 1, the system 100 further includes a number of registration tools 108. As described further below, in use, the surgical planning and assistance device 102 may track the location of the registration tools 108 in space using the array of cameras 132. For example, each registration tool 108 may include a number of hydrophobic optical reflectors arranged in a predetermined pattern visible to the cameras 132. Illustratively, the registration tools 108 include a plurality of arrays 110 configured to each be secured to one of the patient's bones, to the robotic surgical device 104, or to the surgical tool 106. Illustratively, the registration tools 108 also include a pointer 112 configured to be temporarily positioned by a surgeon relative to anatomical landmarks of the patient (e.g., with an end of the pointer 112 in contact those anatomical landmarks) while the pointer 112 is observed by the cameras 132. As such, the registration tools 108 may be used for registration and tracking of the patient's bony anatomy during the orthopaedic surgical procedure. Although illustrated as including registration tools 108 suitable for optical tracking with the cameras 132, it should be understood that in some embodiments, the system 100 may use electromagnetic sensing or other position sensing technology for tracking the registration tools 108.

Further, in addition to the registration tools 108, in some embodiments the system 100 may use other techniques to scan or otherwise register the patient's anatomy. For example, in some embodiments the system 100 may be coupled to or otherwise include a surface scanner such as a laser scanner, a white light scanner, a structured light scanner, ultrasound scanner, or other scanner capable of generating data indicative of the geometry of a bone surface of the patient. As another example, in some embodiments the system 100 may be coupled to or otherwise include a volumetric scanner (e.g., an ultrasound scanner) capable of generating data indicative of a patient's anatomy.

Figure 2A:
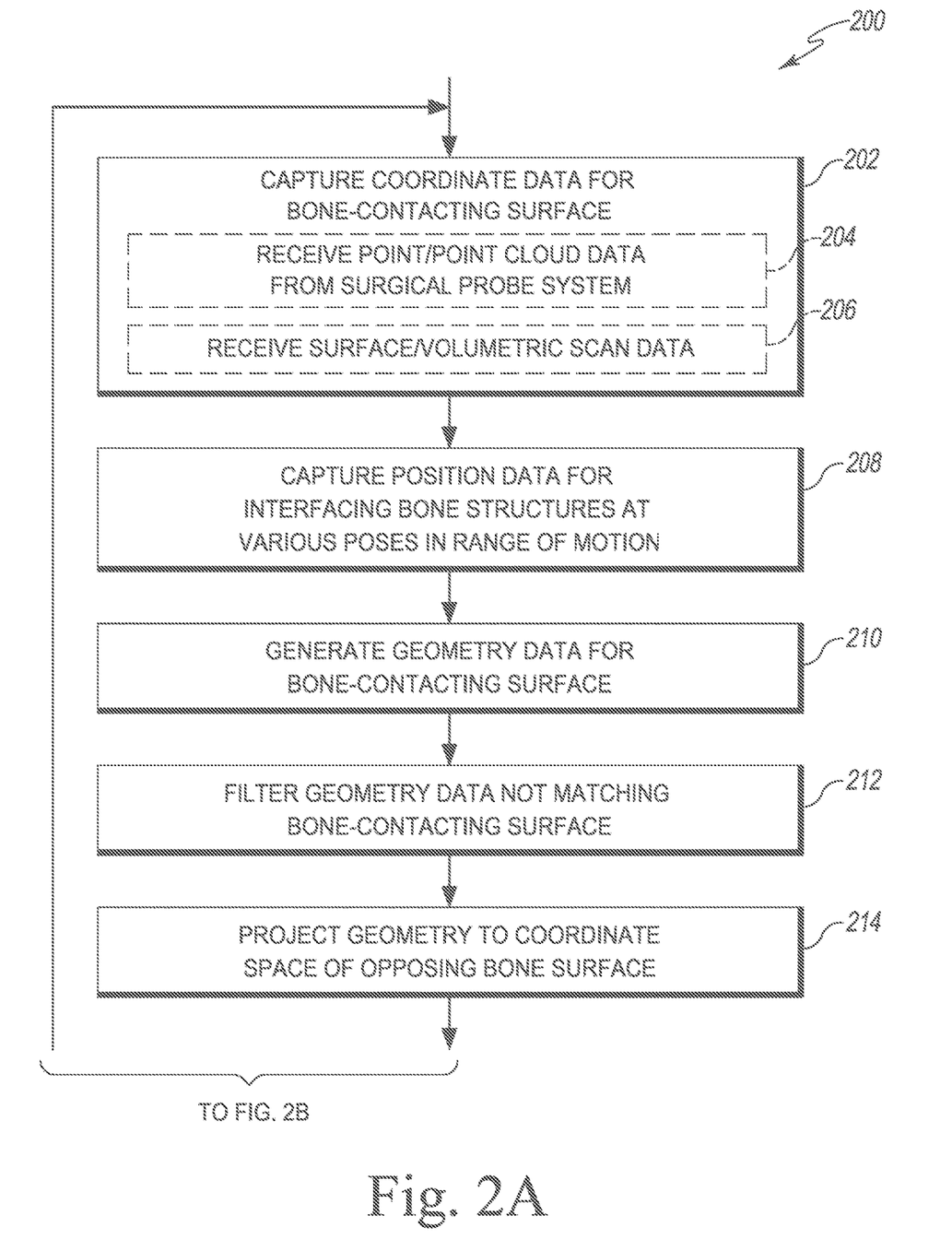
FIGS. 2A and 2B are a simplified flow diagram of a method for bone surface geometry registration that may be executed by the surgical planning and assistance device of FIG. 1.
Figure 2B:
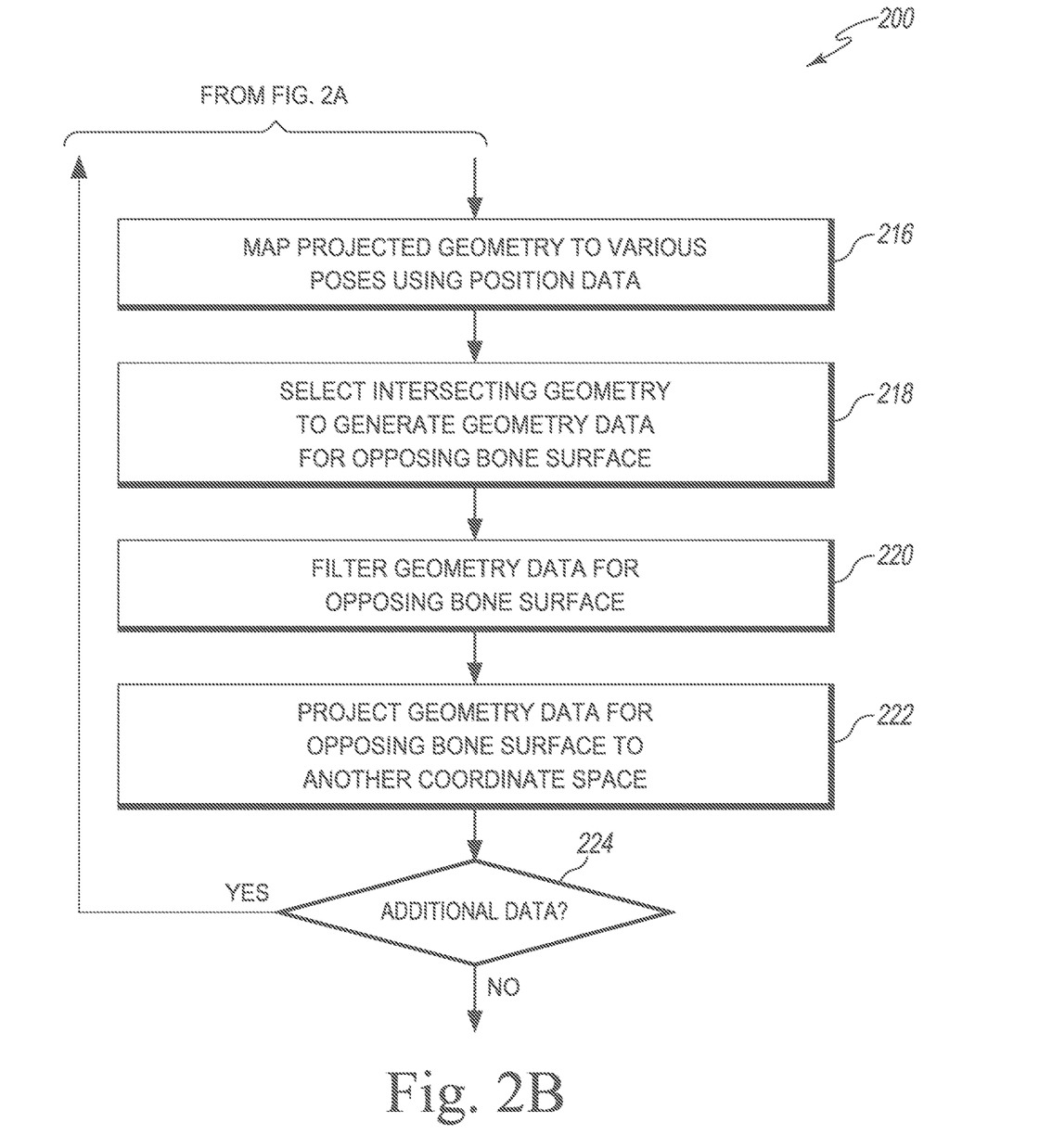

Referring now to FIG. 2, in use, the surgical planning and assistance device 102 may perform a method 200 for bone surface geometry registration. The method 200 begins with block 202, in which the device 102 captures coordinate data for a bone-contacting surface of a patient's anatomy. The coordinate data is indicative of the location in three-dimensional space of one or more features of the bone-contacting surface. The bone-contacting surface may be any rigid or semi-rigid surface that interfaces with a bone of the patient. The bone-contacting surface may itself be (but need not be) another bony surface. For example, in the illustrative embodiment, the bone-contacting surface is a portion of a tibial plateau (medial or lateral). In other embodiments, the bone-contacting surface may be a portion of: a femoral condyle (medial or lateral), a femoral head, an acetabulum, a humeral head, a glenoid, an acromion, cartilage covering a bony surface (including any of the foregoing bony surfaces), or any other bone-contacting surface of the patient's anatomy.

The device 102 may use any appropriate technique to capture the coordinate data. For example, in some embodiments, the device 102 may receive point data or point cloud data generated with one or more registration tools 108 in block 204. For example, the surgeon may use the pointer 112 to touch one or more locations on the bone-contacting surface. During this process, the device 102 uses the cameras 132 to track the positions of the bone arrays 110 and the pointer 112 and thus captures coordinate data for the bone-contacting surface. In some embodiments, the device 102 may additionally or alternatively receive surface scan and/or volumetric scan data for the bone-contacting surface in block 206. For example, the device 102 may receive surface scan data from a laser scanner, a white light scanner, a structured light scanner, or other surface scanner. As another example, the device 102 may receive volumetric scan data from an ultrasound imaging scanner or other volumetric scanner. In some embodiments, the device 102 may capture coordinate data from multiple sources, for example by augmenting points captured during registration using the pointer 112 with volumetric data captured with an ultrasound imaging scanner.

In block 208, the device 102 captures relative position data for interfacing bone structures at various poses in a range of motion for those bone structures. The captured position data may allow the system 100 to determine mechanical axes, landmarks, or other coordinate systems related to the bone structures. For example, in the illustrative embodiment, the device 102 captures relative positions of the tibia and femur at a plurality of poses throughout a range of flexion-extension motion. Continuing that example, the device 102 may capture 40-50 positions randomly sampled throughout a range of 0 to 120 degrees of flexion. In that example, while the surgeon articulates the patient's knee joint through the range of motion, the device 102 uses the cameras 132 to track the position of the bone arrays 110 and thus registers the relative positions of the femur and the tibia at multiple poses in the range of motion. In order to improve accuracy of registration, the surgeon may ensure that the femoral condyle and tibial plateau remain in contact, assess medial/lateral stability, or otherwise improve kinematic axis acquisition for the knee joint.

In block 210, the device 102 generates geometry data for the bone-contacting surface. The geometry data may be generated, for example, based on the coordinate data captured for the bone-contacting surface as described above. The device 102 may perform any technique for generating geometry data based on captured coordinate data. As an example, the device 102 may interpolate a triangular mesh based on the captured coordinate data. As another example, in some embodiments the device 102 may access a bone library that includes models or other measurements of many sample bones (e.g., a statistical shape model). In that example, the device generates a three-dimensional model based on the bone library and then morphs (interpolates) that model to match the patient's specific geometry represented in the captured coordinate data. The geometry data may include data indicative of multiple points, line segments, triangles, polygons, and/or other geometrical data that describes the shape of the bone-contacting surface. In the illustrative embodiment, the geometry data is a triangular mesh. The geometry data may describe the bone-contacting surface in a three-dimensional, Cartesian coordinate system, and may be relative to a surgical coordinate system established by the system 100.

In block 212, the device 102 may filter the geometry data in order to remove geometry that does not match the bone-contacting surface. For example, in some embodiments, the device 102 may remove triangles or other geometry features that are outside of predetermined anatomical boundaries. For example, the device 102 may remove or otherwise ignore geometry outside of bounds in the medial or lateral direction defined by the tibial eminence ridge and the tibia most-medial point or tibia most-lateral point, respectively. Those anatomical boundaries may be captured by the user during a registration process, for example, using the pointer 112 as described above. As another example, the device 102 may remove triangles or other geometry features that are too steep, for example, those triangles with a slope above a predetermined threshold angle. As another example, the device 102 may remove triangles or other geometry features that do not face the opposing bone surface. In order to identify such geometry, the device 102 may compare the orientation of each triangle or other geometry feature to a line through the geometry feature and an imaginary high point defined above the knee center. If this comparison angle exceeds a predetermined threshold angle (e.g., 45 degrees), the geometry may be removed or otherwise ignored.

Figure 9:
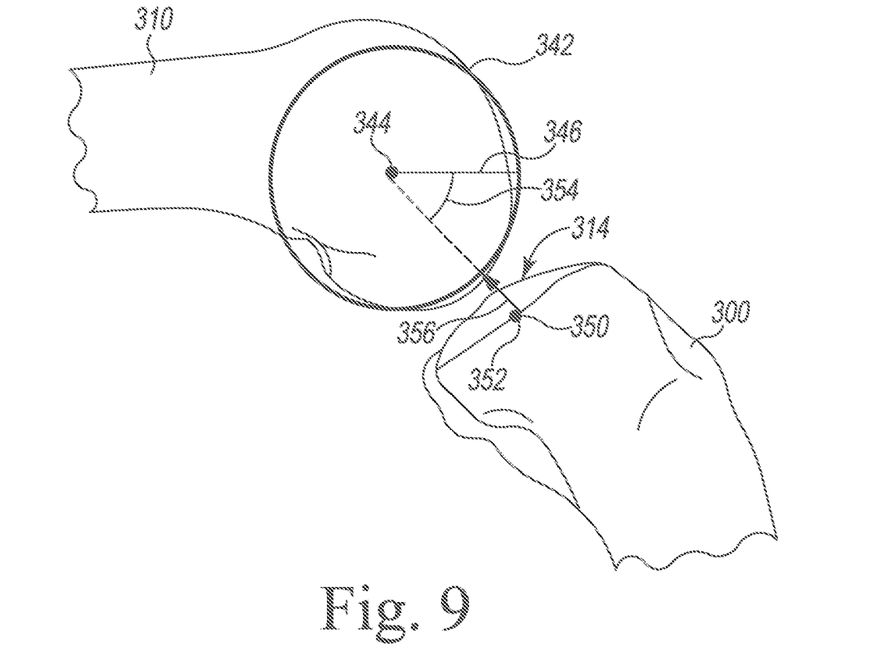
FIG. 9 is a schematic diagram illustrating projection, rotation, and selection of the geometry data that may be performed by the surgical planning and assistance device of FIG. 1 in connection with the method of FIG. 2.

In block 214, the device 102 projects the geometry data from its three-dimensional coordinate space to a coordinate space of the opposing bone surface. For example, as illustrated in the illustrative embodiment of FIGS. 9 and 10 (described further below), the device 102 may project the geometry of the tibial plateau onto a cylindrical projection associated with the femur. That cylindrical projection may use an imaginary cylinder that wraps around a cylinder axis in the sagittal plane, with the cylinder axis coinciding with the femur medial/lateral axis. Continuing that example, the device 102 may project the tibial plateau geometry into the femoral coordinate space by calculating a medial/lateral position on the cylindrical projection axis, an angle of rotation relative to the cylindrical projection axis, and a radial distance from the cylindrical projection axis corresponding to the three-dimensional coordinates associated with each triangle or other geometry feature of the tibial plateau. In some embodiments, the device 102 may store the projected geometry as a cylindrical projection grid with a fixed resolution (e.g., 0.5 mm in the medial/lateral direction and 1 degree in rotation angle per cell in the grid).

In block 216, the device 102 maps the projected geometry from block 214 to various poses throughout the range of motion of the interfacing bone structures using the position data captured in block 208. For example, the device 102 may rotate and/or translate the projected geometry through the range of motion. In the illustrative embodiment, the device 102 sweeps the projected geometry through a range of angles of rotation relative to the cylindrical projection axis. The device 102 may use the captured position data in combination with the projected geometry to determine radial distance from the cylindrical projection axis.

In block 218, the device 102 selects intersecting geometry from among the mapped, projected geometry of block 216 to generate geometry data for the opposing bone surface. For example, in the illustrative embodiment, for each angle of rotation relative to the cylindrical projection axis, and for each cell in the grid of projected geometry, the device 102 may select the triangle (or other geometry feature) from the mapped, projected geometry that has the smallest radial distance from the cylindrical projection axis at the corresponding medial/lateral position. By having the smallest radial distance, the selected geometry features are closest to the opposing bone surface and are thus most likely to be in contact with (or otherwise in close proximity to) the opposing bone surface. Accordingly, the selected geometry features define the geometry of the opposing bone surface.

In block 220, the device 102 may filter the geometry data generated in block 218 for the opposing bone surface. In some embodiments, the device 102 may remove outlier geometry, such as geometry that is more distal or more proximal than other geometry. In some embodiments, the device 102 may remove isolated components, such as triangles or other geometry features that do not contact other geometry features. In some embodiments, the device 102 may smooth the geometry data for the opposing bone surface. Filtering the geometry as described above may improve the accuracy or otherwise improve quality of the geometry data of the opposing bone surface. Additionally or alternatively, in some embodiments, the device 102 may combine the geometry data generated in block 218 with one or more other sources of data regarding the opposing bone surface. For example, the device 102 may integrate point cloud data collected by physically contacting portions of the opposing bone surface with a pointer 112 or data collected by a surface scanner or volumetric scanner.

In some embodiments, the method 200 then proceeds to block 222, in which the device 102 projects the geometry data for the opposing bone surface to another coordinate space. For example, the device 102 may convert the cylindrical map projection data into three-dimensional, Cartesian coordinates. Those coordinates may be relative to the femur or another surgical coordinate system. It will be appreciated that block 222 need not be used in some embodiments of method 200.

In block 224, the device 102 determines whether to capture additional data. Capturing additional data regarding the bone-contacting surface and/or the relative positions of the interfacing bone structures may improve accuracy of the geometry generated for the opposing bone surface. In some embodiments, the device 102 may display a graphical representation of the opposing bone surface. In those embodiments, the surgeon or other user may view this representation of the opposing bone surface and determine whether additional data should be captured. In some embodiments, the device 102 may update the representation of the opposing bone surface in real time or near real time, as additional data is captured. If additional data should be captured, the method 200 loops back to block 202 and continues capturing coordinate data and/or relative position data and generating geometry data.

Referring again to block 224, if the device 102 determines that no additional data should be captured, the method 200 is completed. After completing the method 200, the system 100 may use the geometry data of the opposing bone surface for one or more surgical navigation, robotic assisted surgery, or computer assisted surgery tasks. For example, the device 102 may display, modify, or otherwise use a surgical plan in connection with the geometry of the opposing bone surface. As another example, the robotic surgical device 104 may constrain or otherwise control operation of the surgical saw 106 based on the geometry of the opposing bone surface. The method 200 may be executed repeatedly, for example, to generate geometry for additional bone contacting surfaces.

Figure 3:
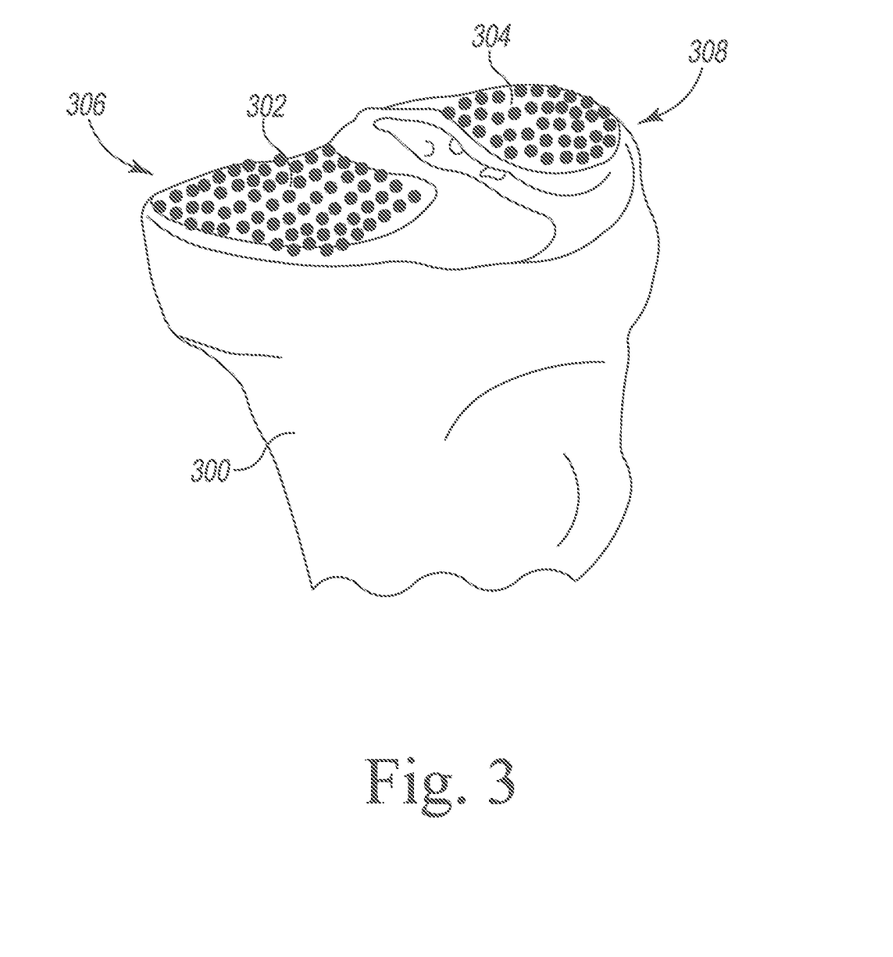
FIG. 3 is a schematic diagram illustrating coordinate data for a tibial plateau that may be captured by the surgical planning and assistance device of FIG. 1 in connection with the method of FIG. 2.

Referring now to FIGS. 3-10, in an illustrative embodiment, the system 100 may be used to generate geometry data for a femoral condyle surface based on registration data captured for part or all of a tibial plateau. As shown in FIG. 3, an illustrative tibia 300 has a medial tibial plateau 302 and a lateral tibial plateau 304. As described above, the surgeon may capture coordinate data for one or more of the tibial plateaus 302, 304 using the pointer 112. For example, as the surgeon runs the pointer 112 along the medial tibial plateau 302, the device 102 may capture a point cloud 306 that is representative of the shape of the medial tibial plateau 302. Similarly, as the surgeon runs the pointer 112 along the lateral tibial plateau 304, the device 102 may capture another point cloud 308 that is representative of the shape of the lateral tibial plateau 304.

Figure 4:
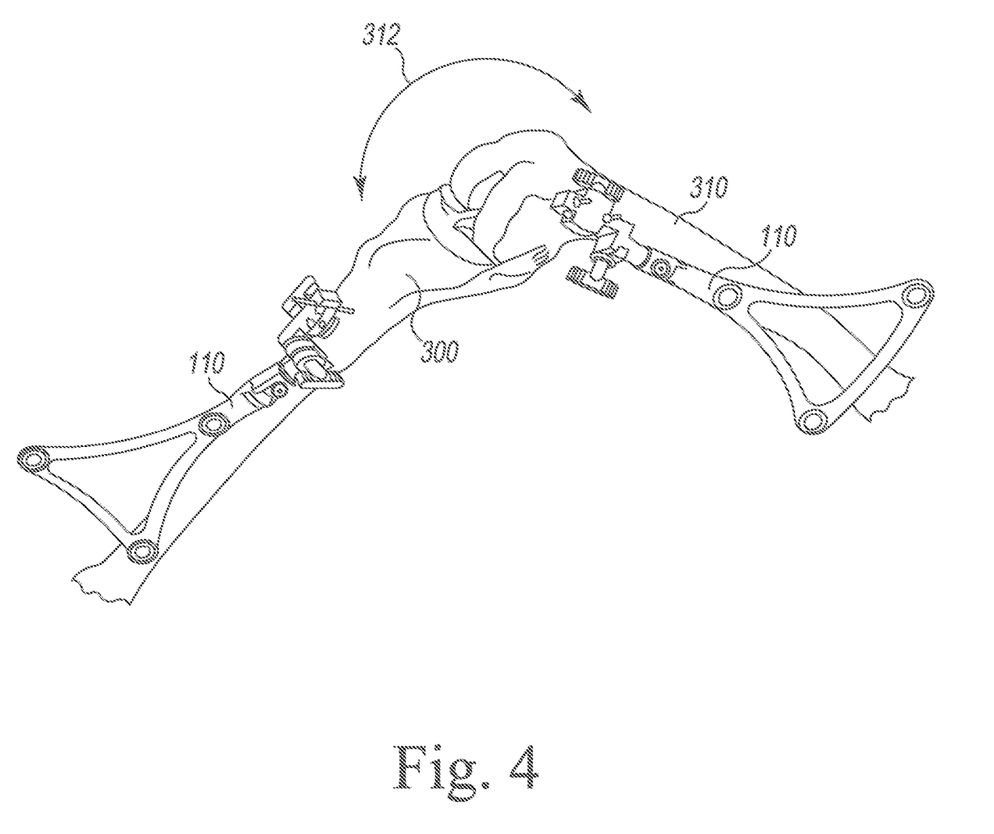
FIG. 4 is a schematic diagram illustrating capture of relative position data for a tibia and a femur that may be captured by the surgical planning and assistance device of FIG. 1 in connection with the method of FIG. 2.

In addition to capturing the point cloud 306, the system 100 also captures relative position data for the knee joint through its range of motion. Referring now to FIG. 4, the illustrative tibia 300 is shown in relation to a femur 310. As shown, bone arrays 110 are attached to the tibia 300 and the femur 310, respectively. The surgeon articulates the tibia 300 and the femur 310 through a range of motion indicated by curved arrow 312, and the device 102 captures relative positions of the bone arrays 110. These captured positions correspond to relative positions of the tibia 300 and the femur 310 at a number of poses throughout the range of motion. Similarly, the device 102 may also capture data indicative of mechanical axes, landmarks, and/or relative coordinate systems for each of the tibia 300 and the femur 310. For example, the device 102 may determine anterior/posterior, medial/lateral, and proximal/distal axes for each of the tibia 300 and the femur 310. Although illustrated as occurring subsequent to capture of the point cloud 306, it should be understood that in some embodiments the position of the tibia 300 and the femur 310 may be captured at a different time relative to capture of the point cloud 306.

Figure 5:
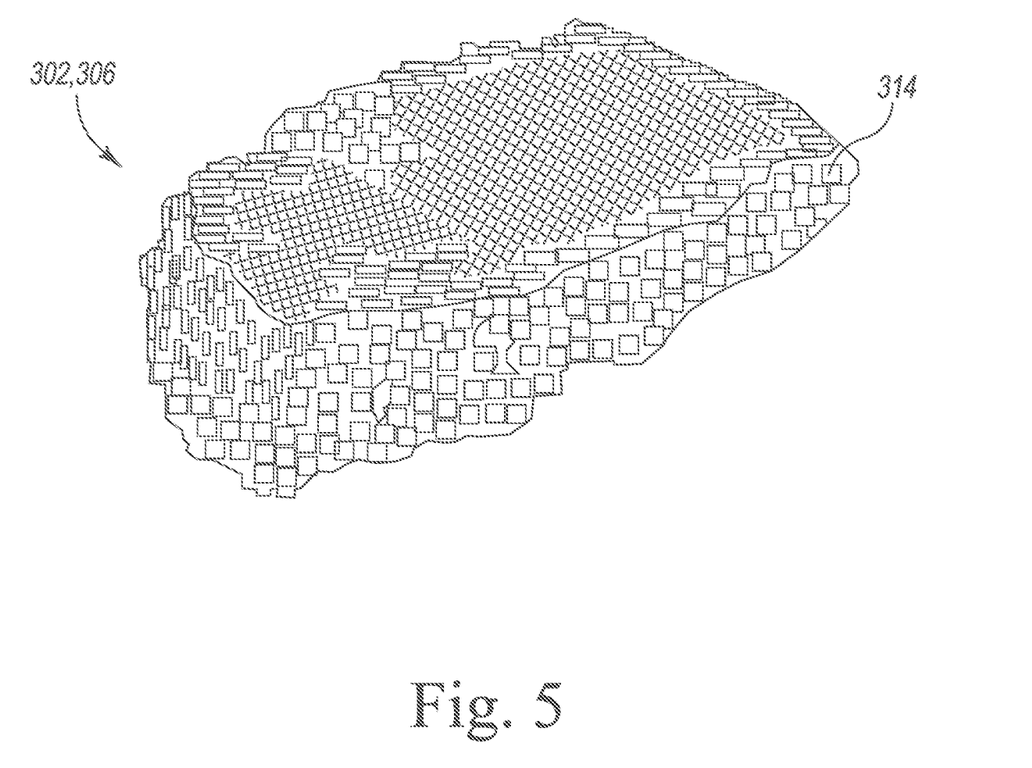
FIG. 5 is a schematic diagram illustrating geometry data for a medial tibial plateau that may be generated by the surgical planning and assistance device of FIG. 1 in connection with the method of FIG. 2.
Figure 6:
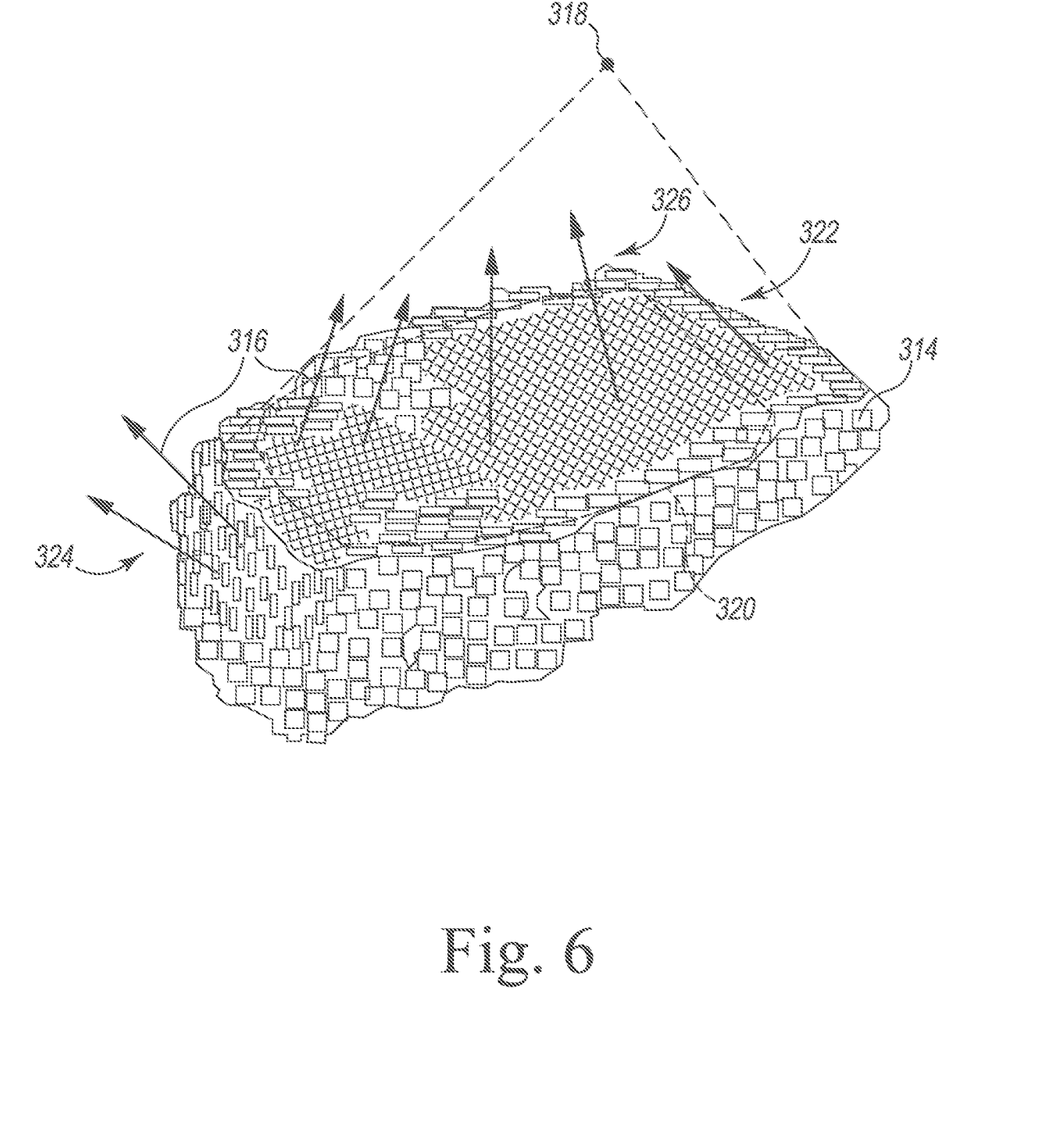
FIG. 6 is a schematic diagram illustrating a filtering process for the geometry data of FIG. 5.

Referring now to FIG. 5, in the illustrative embodiment, after capturing the point cloud data 306, the device 102 generates geometry data 314 based on the point cloud 306 associated with the medial tibial plateau 302 (in some embodiments, the device 102 might additionally or alternatively generate geometry data based on the point cloud 308 associated with the lateral tibial plateau 304). As described above, the geometry data 314 is illustratively a mesh of triangles representing geometry of the medial tibial plateau 302. Referring now to FIG. 6, in some embodiments the geometry data 314 may be filtered by removing triangles that do not face an assumed location of the opposing bone surface of the femur 310. Each triangle of the geometry data 314 is associated with an orientation, which are illustrated in FIG. 6 as normal vectors 316. In order to identify triangles that do not face the opposing bone surface, for each triangle, the device 102 compares the corresponding orientation vector 316 to an imaginary line extending from the center of that triangle to a predetermined, imaginary high point 318. The high point 318 may be defined as an arbitrary point above knee center. The device 102 filters out triangles having an angle between the orientation vector 316 and the line to the high point 318 that is above a predetermined threshold, such as 45 degrees. Additionally or alternatively, the device 102 may further filter out triangles that are positioned outside of a predetermined boundary, as illustrated by perimeter 320. The extent of the perimeter 320 may be determined based on anatomical landmarks, such as the tibial eminence and the most-medial point of the tibial plateau. Those landmarks may be identified by the surgeon or other user during a registration process. Accordingly, in the illustrative embodiment, the device 102 may filter out or otherwise ignore triangles 322, 324. The device 102 continues to process triangles 326, which have been determined to face the opposing bone surface and are within the predetermined boundary.

Figure 7:
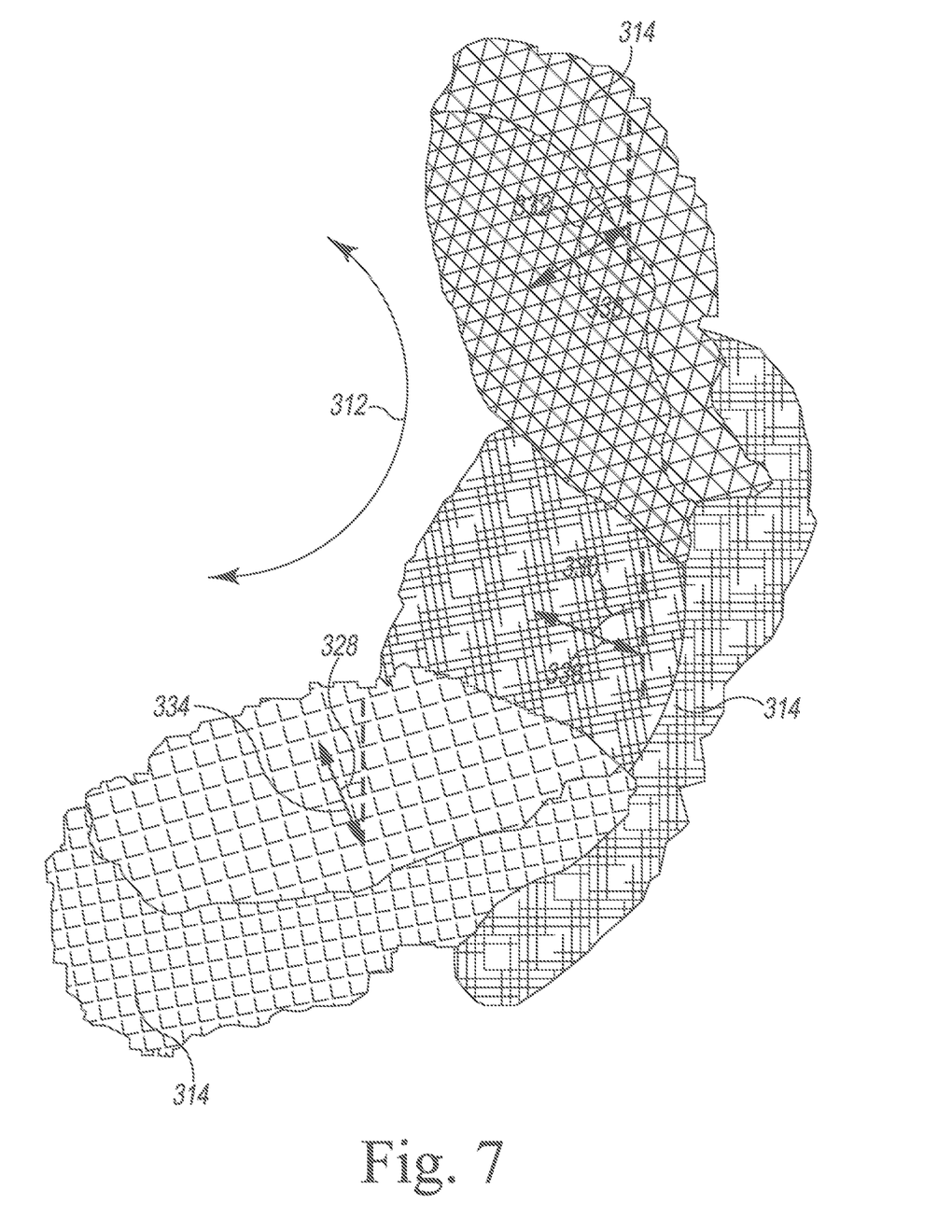
FIG. 7 is a schematic diagram illustrating projected and rotated geometry data for the medial tibial plateau that may be generated by the surgical planning and assistance device of FIG. 1 in connection with the method of FIG. 2.

Referring now to FIG. 7, after generating and filtering the geometry data 314, the device 102 projects the filtered geometry data 314 into the coordinate system of the femur 310, and maps the geometry data 314 to a plurality of poses in the range of motion 312. By way of example, in the illustrative embodiment, shown in FIG. 7 the geometry data 314 is projected and mapped to three rotation angles 328, 330, 332. For each of those rotation angles 328, 330, 332, the geometry data 314 is positioned at a respective relative radial position 334, 336, 338. The device 102 determines those radial positions 334, 336, 338 based on the relative position data associated with the tibia 300 and the femur 310 that was previously captured, as described above. Although illustrated in FIG. 7 as rotated (mapped) to three positions, it should be understood that in other embodiments, the geometry data 314 may be rotated (or otherwise mapped) to a different number of positions. In particular, mapping the geometry data 314 to a larger number of positions (e.g., 40-50 positions) may provide improved accuracy.

Figure 8:
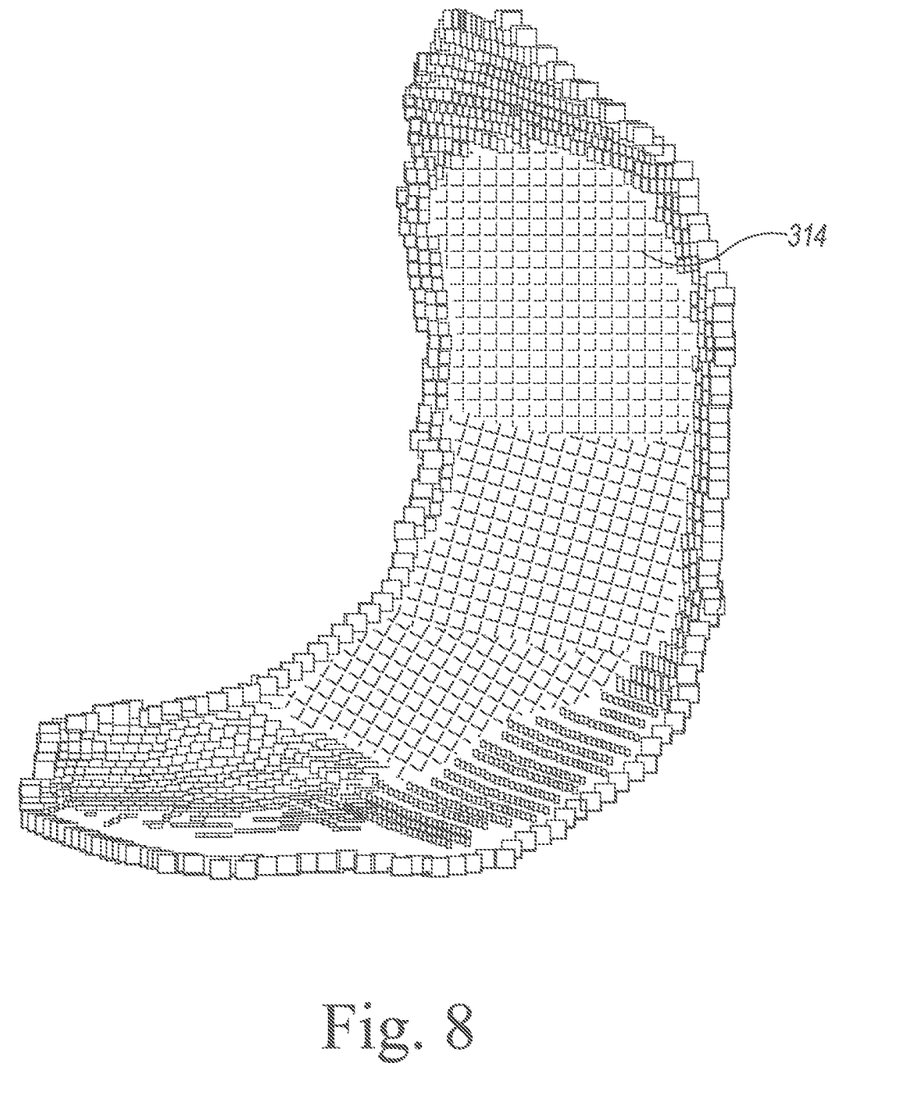
FIG. 8 is a schematic diagram illustrating geometry data for a medial femoral condyle that may be generated by the surgical planning and assistance device of FIG. 1 in connection with the method of FIG. 2.

Referring now to FIG. 8, the device 102 selects intersecting geometry 340 from the mapped, projected geometry 314. In the illustrative embodiment, the intersecting geometry 340 corresponds to the opposing bone surface of the femur 310. As shown in FIG. 8, the intersecting geometry 340 is a triangular mesh, similar to the geometry 314. This intersecting geometry 340 may be reverse projected to a surgical coordinate system or other three-dimensional coordinate system in order to describe the opposing bone surface of the femur 310. As described above, the intersecting geometry 340 may be filtered by removing outliers and/or isolated geometry and may be smoothed in order to improve matching accuracy with the femur 310.

As described above, the device 102 may select the intersecting geometry 340 by projecting the geometry 314 onto a cylindrical projection. The cylindrical projection process is further illustrated in FIG. 9. As shown, an imaginary cylinder 342 is defined relative to the femur 310. An imaginary axis 344 of the cylinder 342 is defined to coincide with the medial/lateral axis of the femur 310. A radius 346 of the cylinder 342 is estimated as the distance of the tibial plateau center point through the range of motion 312, which is determined using the captured relative position data of the tibia 300 and the femur 310. Accordingly, each point in the cylindrical projection coordinate system may be defined by a medial/lateral distance along the axis 344, an angle of rotation about the axis 344, and a radial distance from the axis 344. The angle of rotation about the axis 344 is an angle in the sagittal plane and approximately corresponds to a flexion/extension angle of the knee joint. The radial distance may be defined as a radial distance between the geometry and the axis 344 or as a difference between that distance and the radius 346 of the imaginary cylinder 342. As an illustration, a triangle 350 of the geometry 314 may be mapped to a medial/lateral position 352 (shown as an end-on vector in FIG. 9), an angle 354, and a radial distance 356.

Figure 10:
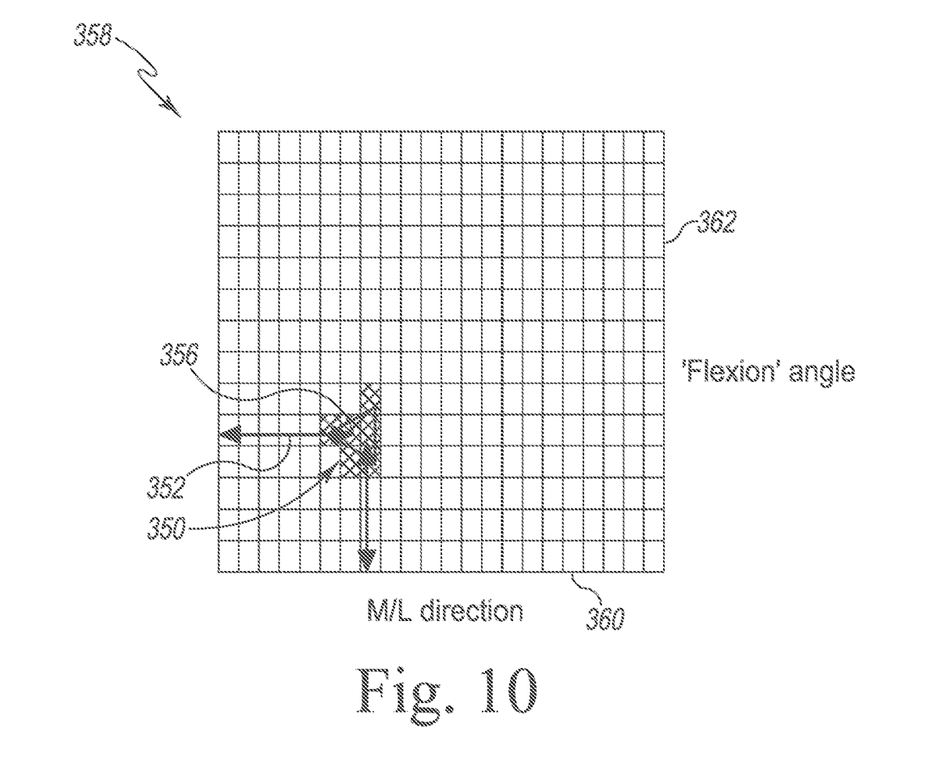
FIG. 10 is a schematic diagram illustrating a cylindrical map projection that may be performed by the surgical planning and assistance device of FIG. 1 in connection with the method of FIG. 2.

Referring now to FIG. 10, a grid 358 illustrates a cylindrical projection map that may be generated by the device 102. The grid 358 is defined by an axis 360 corresponding to medial/lateral position along the axis 344, and is further defined by an axis 362 corresponding to angle of rotation about the axis 344. As described above, the illustrative grid 358 has a fixed resolution (e.g., 0.5 mm in the medial/lateral direction and 1 degree in rotation angle per grid cell). Each cell of the grid 358 records a radial distance value selected from the projected, rotated geometry 314 for the corresponding coordinate pair of medial/lateral position and angle of rotation. For example, for the triangle 350 of the geometry 314 shown in FIG. 9, the distance 356 may be recorded at a cell corresponding to the medial/lateral distance 352 and the angle of rotation 354. In some embodiments, distance 356 may be sampled over the triangle 350 at a number of finite points corresponding to cells in the grid 358. The device 102 similarly records radial distance values for each triangle of the geometry 314 at the corresponding medial/lateral position and angle. As described above, as the projected geometry 314 is rotated through the range of motion 312, the device 102 may retain the smallest radial distance for those triangles that each intersect a particular cell of the grid 358. This achieves a carving/sculpting effect whereby the intersecting geometry matches geometry of the opposing bone surface. After rotating the projected geometry 314 through the range of motion 312, the device 102 may reverse-project the grid 358 to a Cartesian coordinate system in order to generate the intersecting geometry 340 shown in FIG. 8. In effect, the grid 358 (including radial distance values) is also converted to a triangular mesh.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure.

The invention claimed is:

1. A method for bone surface geometry generation, the method comprising:
projecting, by a computing device, first geometry data indicative of a first bone-contacting surface of a first bone of a patient to a coordinate space of a second bone of the patient to generate projected geometry, wherein the second bone includes a second bone-contacting surface that interfaces with the first bone-contacting surface;
mapping, by the computing device, the projected geometry to a plurality of poses in a range of motion of the first bone relative to the second bone using position data indicative of relative positions of the first bone and the second bone at the plurality of poses in the range of motion; and
selecting, by the computing device, intersecting geometry from the mapped, projected geometry to generate second geometry data indicative of the second bone-contacting surface;
wherein projecting the first geometry data to the coordinate space comprises projecting the first geometry data to a cylindrical coordinate space having a first axis indicative of a linear position along a first imaginary axis relative to the first bone and a second axis indicative of an angle of rotation of the first bone relative to the second bone.

2. The method of claim 1, further comprising:
capturing, by the computing device, coordinate data indicative of the first bone-contacting surface; and
generating, by the computing device, the first geometry data based on the coordinate data.

3. The method of claim 2, further comprising capturing, by the computing device, the position data indicative of relative positions of the first bone and the second bone at the plurality of poses in the range of motion.

4. The method of claim 2, wherein capturing the coordinate data comprises receiving point data associated with a location of a registration tool having a pointer in contact with the first bone-contacting surface.

5. The method of claim 2, wherein capturing the coordinate data comprises receiving surface scan data from a laser scanner, a white light scanner, or a structured light scanner.

6. The method of claim 2, wherein capturing the coordinate data comprises receiving volumetric scan data from an ultrasound scanner.

7. The method of claim 1, wherein the first axis of the cylindrical coordinate space is indicative of a medial/lateral position, and the second axis of the cylindrical coordinate space is indicative of an angle of rotation in a sagittal plane.

8. The method of claim 1, wherein mapping the projected geometry to each of the plurality of poses in the range of motion using the position data comprises mapping coordinates of the first geometry to a linear position on the first axis, an angular position on the second axis, and a radial distance from the second bone.

9. The method of claim 8, wherein selecting the intersecting geometry comprises selecting, for each combination of linear position on the first axis and angular position on the second axis, a smallest radial distance from the second bone of the mapped, projected geometry.

10. The method of claim 1, further comprising filtering, by the computing device, the first geometry data to remove geometry that does not interface with the second bone-contacting surface of the second bone.

11. The method of claim 10, wherein filtering the first geometry data comprises removing geometry data outside of predetermined bounds.

12. The method of claim 10, wherein filtering the first geometry data comprises removing geometry data having a slope above a predetermined threshold.

13. The method of claim 10, wherein filtering the first geometry data comprises removing geometry data that faces away from the second bone-contacting surface, wherein geometry data that faces away from the second bone-contacting surface has an angle that is above a predetermined threshold relative to an imaginary high point in the direction of the second bone-contacting surface.

14. The method of claim 1, further comprising filtering, by the computing device, the second geometry data, wherein filtering the second geometry data comprises at least one of removing geometry data that comprises outlier geometry or removing geometry data that is isolated from other geometry data of the second geometry data.

15. The method of claim 1, wherein the first bone is a tibia, the second bone is a femur, the bone-contacting surface is a tibial plateau, and the second bone-contacting surface is a femoral condyle.

* * * * *